(12) United States Patent
Schmier, II et al.

(10) Patent No.: US 7,472,493 B2
(45) Date of Patent: Jan. 6, 2009

(54) APPARATUS AND METHOD FOR LOCATING A BLIND HOLE

(75) Inventors: Mark A. Schmier, II, Mesa, AZ (US); Paul J. Strand, Mesa, AZ (US)

(73) Assignee: Boeing Company, Chicago, IL (US)

( * ) Notice: Subject to any disclaimer, the term of this patent is extended or adjusted under 35 U.S.C. 154(b) by 6 days.

(21) Appl. No.: 11/752,464

(22) Filed: May 23, 2007

(65) Prior Publication Data

US 2008/0289207 A1    Nov. 27, 2008

(51) Int. Cl.
*B25H 7/04* (2006.01)
*G01B 5/25* (2006.01)

(52) U.S. Cl. .............................. 33/671; 33/613; 29/276; 29/257; 269/143; 269/249

(58) Field of Classification Search .................... 33/613, 33/645, 669, 670, 671, 674, 676, 679; 29/276, 29/257; 269/143, 249; 403/DIG. 9
See application file for complete search history.

(56) References Cited

U.S. PATENT DOCUMENTS

| | | | | |
|---|---|---|---|---|
| 519,249 A | * | 5/1894 | Farwell | 33/670 |
| 1,076,979 A | * | 10/1913 | Haddock | 33/674 |
| 1,470,706 A | * | 10/1923 | Day | 269/215 |
| 3,704,014 A | * | 11/1972 | Keene | 269/249 |
| 4,363,475 A | * | 12/1982 | McCarty | 269/249 |
| 4,691,907 A | * | 9/1987 | Yang | 269/249 |
| 4,962,918 A | * | 10/1990 | Yang | 269/249 |
| 5,568,915 A | * | 10/1996 | Raymond | 269/147 |
| 5,568,916 A | * | 10/1996 | Gibbons et al. | 269/249 |
| 2004/0032070 A1 | * | 2/2004 | Genduso | 269/249 |

* cited by examiner

*Primary Examiner*—G. Bradley Bennett
(74) *Attorney, Agent, or Firm*—Law Office of Donald D. Mondul (57) ABSTRACT

An apparatus for locating at least one site on a first side of a workpiece in a predetermined relation with at least one aperture located on a second side of the workpiece includes: (a) at least one first locus-fixing structure; each respective first locus-fixing structure of the at least one first locus-fixing structure being configured for effecting the locating at least one respective site of the at least one site; (b) at least one second locus-fixing structure configured for cooperating with the at least one aperture to substantially fix the at least one second locus-fixing structure with respect to the workpiece in an installed orientation; and (c) a substantially rigid connecting member coupled with the at least one first locus-fixing structure and the at least one second locus-fixing structure. The connecting member situates the at least one first locus-fixing structure substantially in the predetermined relation in the installed orientation.

16 Claims, 5 Drawing Sheets

APPARATUS AND METHOD FOR LOCATING A BLIND HOLE

BACKGROUND

There may be occasions when one is presented with a workpiece having an aperture on one side and a blank face on an opposing side, and one may be required to fashion an aperture in the blank face substantially coaxial with the existing aperture. Such an operation may be referred to as locating a blind hole. By way of example and not by way of limitation, such a situation may be presented when a multilayered structure having an aperture therethrough is repaired. In the course of repair a replacement layer may be installed on one face of the structure, and an aperture may need to be created in the new layer that is in line or coaxial with the aperture already traversing other layers of the structure.

There is a need for an apparatus and method for locating a blind hole that can reliably and repeatably locate at least one site on a first side of a workpiece in a predetermined relation with at least one aperture located on a second side of the workpiece.

SUMMARY

An apparatus for locating at least one site on a first side of a workpiece in a predetermined relation with at least one aperture located on a second side of the workpiece includes: (a) at least one first locus-fixing structure; each respective first locus-fixing structure of the at least one first locus-fixing structure being configured for effecting the locating at least one respective site of the at least one site; (b) at least one second locus-fixing structure configured for cooperating with the at least one aperture to substantially fix the at least one second locus-fixing structure with respect to the workpiece in an installed orientation; and (c) a substantially rigid connecting member coupled with the at least one first locus-fixing structure and the at least one second locus-fixing structure. The connecting member situates the at least one first locus-fixing structure substantially in the predetermined relation in the installed orientation.

A method for locating at least one site on a first side of a workpiece in a predetermined relation with at least one aperture located on a second side of the workpiece includes: (a) in no particular order: (1) providing at least one first locus-fixing structure; each respective first locus-fixing structure of the at least one first locus-fixing structure being configured for effecting the locating at least one respective site of the at least one site; (2) at least one second locus-fixing structure configured for cooperating with the at least one aperture to substantially fix the at least one second locus-fixing structure with respect to the workpiece in an installed orientation; and (3) a substantially rigid connecting member coupled with the at least one first locus-fixing structure and the at least one second locus-fixing structure; and (b) deploying the at least one second locus-fixing structure in the installed orientation; the connecting member situating the at least one first locus-fixing structure substantially in the predetermined relation in the installed orientation.

It is, therefore, a feature of the present invention to provide an apparatus and method for locating a blind hole that can reliably and repeatably locate at least one site on a first side of a workpiece in a predetermined relation with at least one aperture located on a second side of the workpiece.

Further features of the present invention will be apparent from the following specification and claims when considered in connection with the accompanying drawings, in which like elements may be labeled using like reference numerals in the various figures, illustrating embodiments of the invention.

DETAILED DESCRIPTION

Figures 1, 2:
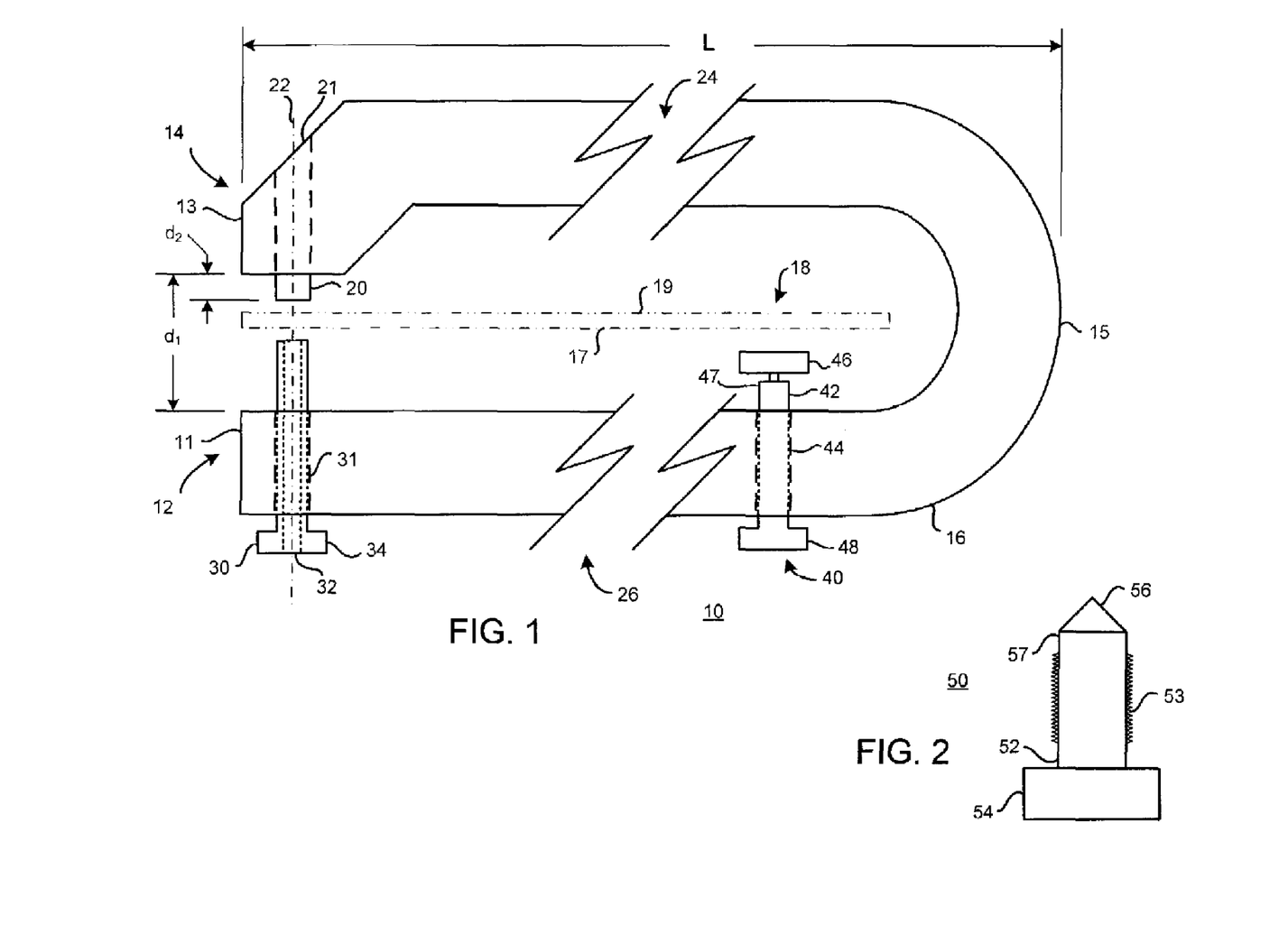
FIG. 1 is a schematic side view of an embodiment of the invention.
FIG. 2 is a schematic side view of an alternate embodiment of a site locating unit that may be employed with embodiments of the invention.

FIG. 1 is a schematic side view of an embodiment of the invention. In FIG. 1, a blind hole locator apparatus 10 may include a first locus-fixing structure 12 and a second locus-fixing structure 14 coupled by a connecting member 16. First locus-fixing structure 12 may be situated at a first end 11 of connecting member 16. Second locus-fixing structure 14 may be situated at a second end 13 of connecting member 16. Connecting member 16 may be substantially rigid and may have a length L of sufficient dimension to reach around a workpiece 18 (shown in phantom in FIG. 1) between a first side 17 and a second side 19 of workpiece 18 by a bight-shaped connecting structure 15 connecting ends 11, 13. Connecting member 16 is illustrated in FIG. 1 with break indications 24, 26 to indicate that connecting member 16 may be manufactured to establish any particular appropriate length L necessary to effect reaching around a particular workpiece 18. Ends 11, 13 may be separated by a distance $d_1$ to accommodate a workpiece having a thickness approximately equal with or less than distance $d_1$.

First locus-fixing structure 12 may include a site locating unit 30 installed within an aperture 31. Site locating unit 30 may be embodied in a drill bushing having a drilling aperture 32 traversing site locating unit 30 substantially coaxially with an axis 22 in an installed orientation with workpiece 18 compressively captured between site locating unit 30 and second end 13 of connecting member 16. Drilling aperture 32 may be configured for accepting a drilling tool of appropriate size to produce a drilled aperture (not shown in FIG. 1) in a first side 17 of workpiece 18 that is substantially similar in orientation with respect to axis 22 as a reference aperture in a second side 19 of workpiece 18, as shall be described in connection with FIG. 3. The drilled aperture may be similar in size to the size of the reference aperture. Alternately, the drilled aperture may be a different size compared with the size of the reference aperture. By way of example and not by way of limitation, one may drill a pilot aperture substantially similar in orientation with respect to axis 22, but smaller than the size of the reference aperture. In a subsequent step a larger aperture may be drilled using the pilot aperture as a guide.

Site locating unit 30 and aperture 31 may be configured to effect threaded engagement of site locating unit 30 within aperture 31 to facilitate controlled advancement of site locating unit 30 through aperture 31 to effect compressively capturing workpiece 18 between site locating unit 30 and second end 13 of connecting member 16 to establish apparatus 10 an installed orientation with workpiece 18. Site locating unit 30 may include an integral actuating section 34 for presenting an enhanced manual engagement by a user for facilitating hand rotation to effect threaded advancement of site locating unit 30 through aperture 31.

Second locus-fixing structure 14 may include a locating pin 20 for insertion within a reference aperture (not shown in detail in FIG. 1; see FIG. 3) in second side 19 of workpiece 18. Locating pin 20 may be press-fit within an aperture 21 or otherwise removably affixed with connecting member 16. Such removable installation of locating pin 20 may facilitate replacement of locating pin 20 in the event of damage, excessive wear or another event involving locating pin 20 affecting trueness of alignment of locating pin 20. Locating pin 20 may be substantially symmetrically oriented about axis 22. Connecting member 16 may be configured to fixedly assure a substantially coaxial relation by locating pin 20 and site locating unit 30 about axis 22. Locating pin 20 may be configured having any of various cross-sections including by way of example and not by way of limitation cylindrical, square, star-shaped or another cross-section. Locator pin 20 may extend a distance $d_2$ from end 13 of connecting member 16 to accommodate reference apertures having a depth substantially up to distance $d_2$.

Apparatus 10 may also include at least one additional support member 40. Support member 40 may be embodied in a shaft 42 threadedly received within a support aperture 44. Shaft 42 may have an engagement member 46 affixed at an end 47 proximate to workpiece 18 in an installed orientation. Support member 40 may include an integral actuating section 48 for presenting an enhanced manual engagement by a user for facilitating hand rotation to effect threaded advancement of support member 40 through aperture 44. Threaded reception of shaft 42 within support aperture 44 may facilitate controlled advancement by shaft 42 through support aperture 44 to urge engagement member 46 against workpiece 18 in an installed orientation to provide additional fixing support between apparatus 10 and workpiece 18 during operations upon workpiece 18 such as, by way of example and not by way of limitation, drilling operations on workpiece 18 conducted through drilling aperture 32. By way of example and not by way of limitation, engagement member 46 may be embodied in a foot structure made of nylon, teflon, neoprene or another material that may be fixedly installed on shaft 42. Engagement structure 46 may be rotatably installed on shaft 42 so as to accommodate orientations between workpiece 18 and shaft 42 other than a generally perpendicular orientation. Engagement structure 46 may be integrally formed with shaft 42.

FIG. 2 is a schematic side view of an alternate embodiment of a site locating unit that may be employed with embodiments of the invention. In FIG. 2, a site locating unit 50 may include a threaded shaft 52 configured for threaded engagement using threads 53 within an aperture such as, by way of example and not by way of limitation, aperture 31 in connecting member 16 (FIG. 1). Site locating unit 50 may include an integral actuating section 54 for presenting an enhanced manual engagement by a user for facilitating hand rotation to effect threaded advancement of site locating unit 50 through an aperture. Shaft 52 may have a location indicator 56 at an end 57 that may proximate to a workpiece in an installed orientation. Threaded reception of shaft 52 within an aperture (e.g., aperture 31; FIG. 1) may facilitate controlled advancement by shaft 52 through the aperture to urge location indicator 56 against a workpiece to provide an indication of location of an axis associated with a locator pin (e.g., axis 22 associated with locator pin 20; FIG. 1) with respect to a workpiece (e.g., workpiece 18; FIG. 1). Location indicator 56 may effect location indication on a workpiece (e.g., workpiece 18; FIG. 1) by effecting an indentation, an inked mark or another indicator in or on the workpiece to mark a location for a later operation, such as a drilling operation, a punching operation or another manufacturing step.

Figure 3:
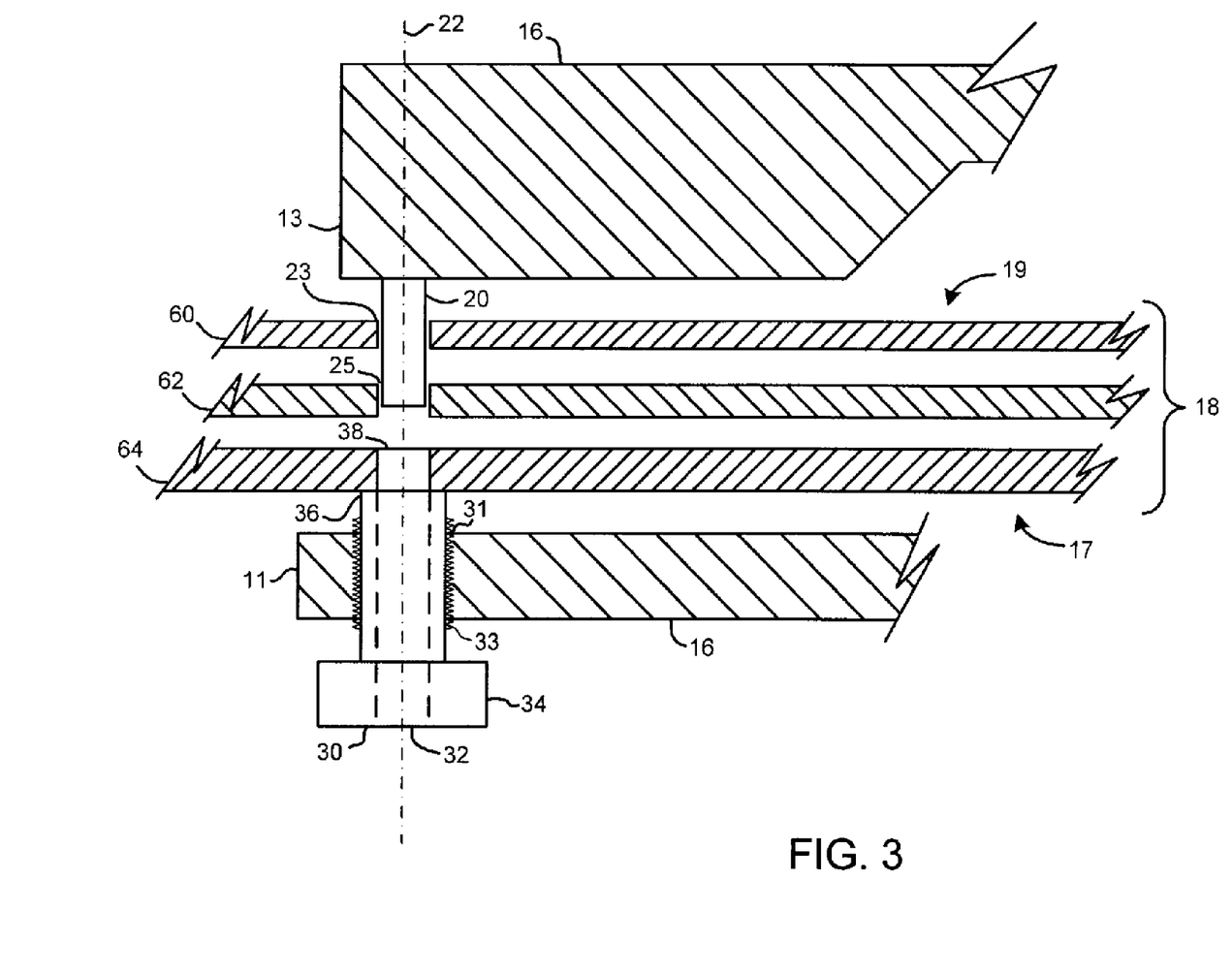
FIG. 3 is a schematic side view in partial section of details of the embodiment of the invention illustrated in FIG. 1.

FIG. 3 is a schematic side view in partial section of details of the embodiment of the invention illustrated in FIG. 1. In FIG. 3, an enlarged detailed portion of connection member 16 is illustrated positioned nearly in an installed orientation with a workpiece 18 illustrated in an exploded view. Workpiece 18 may not be encountered in an exploded arrangement as illustrated in FIG. 3 in practice. Workpiece 18 is illustrated in FIG. 3 in an exploded view in order to show details of construction of workpiece 18.

Workpiece 18 may include a plurality of layers 60, 62, 64. Workpiece 18 may include substantially more than three layers 60, 62, 64; three layers are illustrated here for simplicity of explanation. Layers 60, 62, 64 may be laminated to form an integral workpiece 18. However, layer 64 may have been recently added to workpiece 18 as part of a repair process. As a result of the repair adding a new layer 64, apertures 23, 25, which originally may have cooperated with another aperture in the original layer 64 of workpiece 18 (before repairs were made) to traverse the entire depth of workpiece 18 may now only traverse layers 60, 62. It may be important to ensure that an aperture 38 may be drilled or otherwise manufactured or installed in layer 64 substantially precisely aligned with axis 22 so that apertures 23, 25, 38 may be substantially in register and coaxial with respect to axis 22, and substantially the same diameter.

In placing connecting member 16 in an installed orientation with workpiece 18, one may place locating pin 20 within at least one of apertures 23, 25. The fit of locating pin 20 within apertures 23, 25 is illustrated as being relatively loose in FIG. 1, mainly to provide an easily understood explanation. The fit of locating pin 20 within apertures 23, 25 may be preferably a substantially close fit in order to assure accuracy of positioning of site locating unit 30 for locating aperture 38. When locating pin 20 is in at least one of apertures 23, 25 the rigid character of connecting member 16 may assure that site locating unit 30 is substantially in register with axis 22. It is for this reason that apertures 23, 25 may be referred to as reference apertures.

With locating pin 20 in at least one of reference apertures 23, 25, site locating unit 30 may be threadedly advanced through connecting member 16 such as, by way of example and not by way of limitation, by threads 33 within a complementarily threaded aperture 31. Site locating unit 30 may be advanced sufficiently to substantially compressively capture workpiece 18 between an engaging end 36 of site locating unit 30 and second end 13 of connecting member 16. This compressively captured relationship among connecting member 16, workpiece 18 and site locating unit 30 may be regarded as an installed orientation that may provide a stable aligned guide for a drilling or other operation coaxially arranged with respect to reference apertures 23, 25.

Additional stability may be provided in an installed orientation, if desired, by threadedly advancing an additional support member (e.g., additional support member 40; FIG. 1) through connecting member 16 to bear against workpiece 18. Such an additional support member is not included in FIG. 3. If desired, more than one additional support member similar to additional support member 40 may be provided.

Drilling aperture 32 may be configured to permit substantially straight, non-rocking passage of a drill bit through drilling aperture 32 in site locating unit 30 to effect creating drilled aperture 38 having substantially the same diameter as reference apertures 23, 25, and being substantially coaxial with reference apertures 23, 25 about axis 22.

Figure 4:
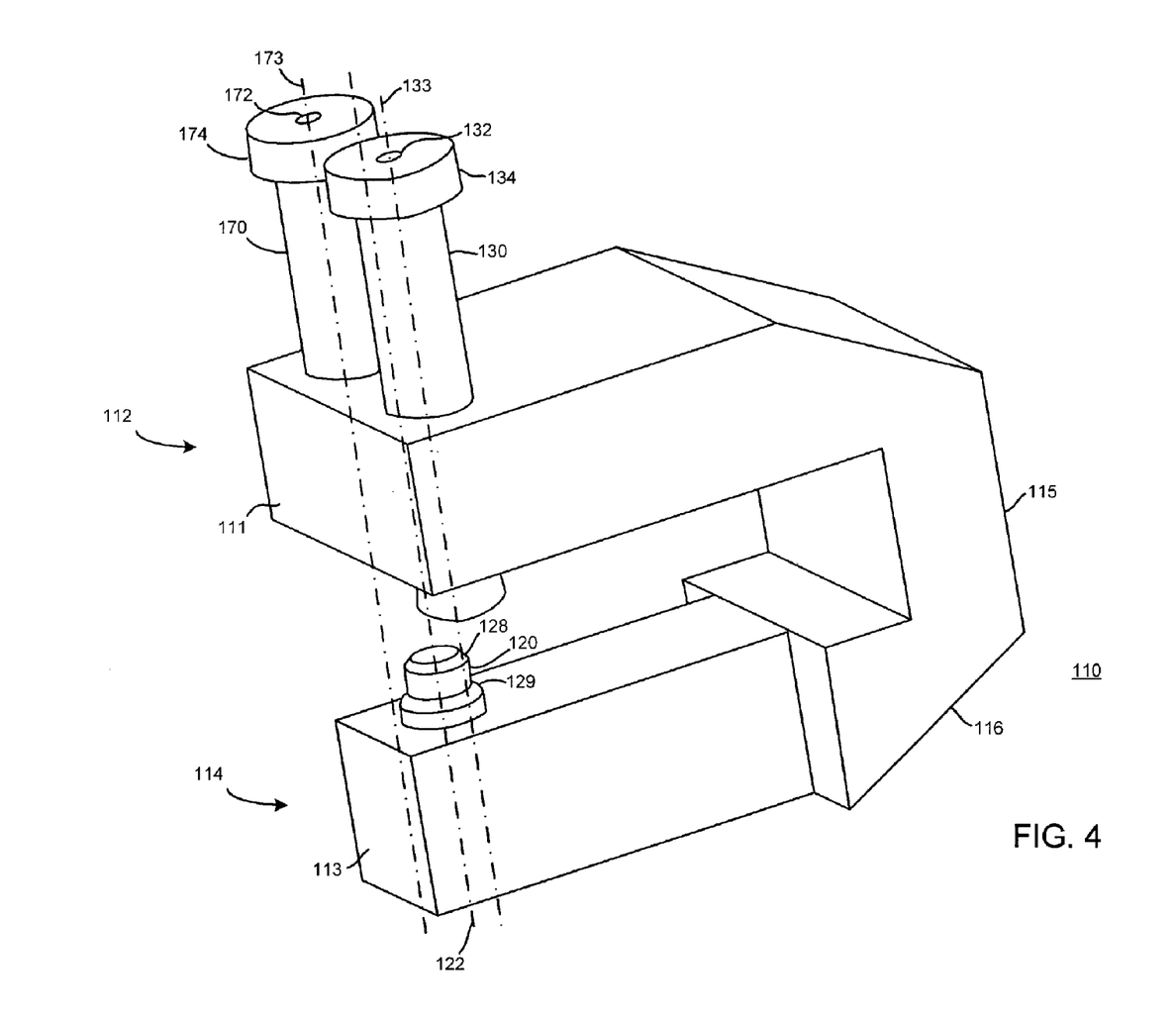
FIG. 4 is a perspective view of a second embodiment of the invention.

FIG. 4 is a perspective view of a second embodiment of the invention. In FIG. 4, a blind hole locator apparatus 110 may include a first locus-fixing structure 112 and a second locus-fixing structure 114 coupled by a connecting member 116. First locus-fixing structure 112 may be situated at a first end 111 of connecting member 116. Second locus-fixing structure 114 may be situated at a second end 113 of connecting member 116. Connecting member 116 may be substantially rigid and may have a length of sufficient dimension to reach around a workpiece (not shown in FIG. 4) by a bight-shaped connecting structure 115 connecting ends 111, 113. Ends 111, 113 may be separated by a distance appropriate to accommodate a workpiece.

First locus-fixing structure 112 may include two site locating units 130, 170. First locus-fixing structure 112 may include more than two site locating units 130, 170; two site locating units are illustrated here for simplicity of explanation.

Site locating unit 130 may be embodied in a drill bushing having a drilling aperture 132 traversing site locating unit 130 substantially coaxially with an axis 173. Drilling aperture 132 may be configured for accepting a drilling tool of appropriate size to produce a drilled aperture in a workpiece (not shown in FIG. 4) that is in a fixed relationship with respect to an axis 122. Axis 122 is associated with a locating pin 120, as will be described below.

Site locating unit 130 may be configured to effect threaded engagement of site locating unit 130 with connecting member 116 to facilitate controlled advancement of site locating unit 130 through connecting member 116 to effect compressively capturing a workpiece in an installed orientation between site locating unit 130 and second end 113 of connecting member 116. Site locating unit 130 may include an integral actuating section 134 for presenting an enhanced manual engagement by a user for facilitating hand rotation to effect threaded advancement of site locating unit 130 through connecting member 116.

Site locating unit 170 may be embodied in a drill bushing having a drilling aperture 172 traversing site locating unit 170 substantially coaxially with an axis 173.Drilling aperture 172 may be configured for accepting a drilling tool of appropriate size to produce a drilled aperture in a workpiece (not shown in FIG. 4) that is in a fixed relationship with respect to an axis 122. Axis 122 is associated with a locating pin 120, as will be described below.

Site locating unit 170 may be configured to effect threaded engagement of site locating unit 170 with connecting member 116 to facilitate controlled advancement of site locating unit 170 through connecting member 116 to effect compressively capturing a workpiece in an installed orientation between site locating unit 170 and second end 113 of connecting member 116. Site locating unit 170 may include an integral actuating section 174 for presenting an enhanced manual engagement by a user for facilitating hand rotation to effect threaded advancement of site locating unit 170 through connecting member 116.

Second locus-fixing structure 114 may include a locating pin 120 for insertion within a reference aperture (not shown in detail in FIG. 4; see FIG. 3) in a workpiece. Second locus-fixing structure 114 may include more than one locating pin 120; one locating pin is illustrated here for simplicity of explanation. Locating pin 120 may be press-fit within connecting member 116 or otherwise removably affixed with connecting member 116. Such removable installation of locating pin 120 may facilitate replacement of locating pin 120 in the event of damage, excessive wear or another event involving locating pin 120 affecting trueness of alignment of locating pin 120. Locating pin 120 may be substantially symmetrically oriented about axis 122. Connecting member 116 may be configured to fixedly assure a predetermined relation among axes 122,133,173. Locating pin 120 may be configured having any of various cross-sections including by way of example and not by way of limitation cylindrical, square, star-shaped or another cross-section. Locator pin 120 may extend a distance from end 113 of connecting member 116 sufficient to accommodate seating within reference apertures in a workpiece. Locator pin 120 may be provided with chamfers or beveled edges 128, 129 to facilitate seating of locator pin 120 within a reference aperture in a workpiece.

Figure 5:
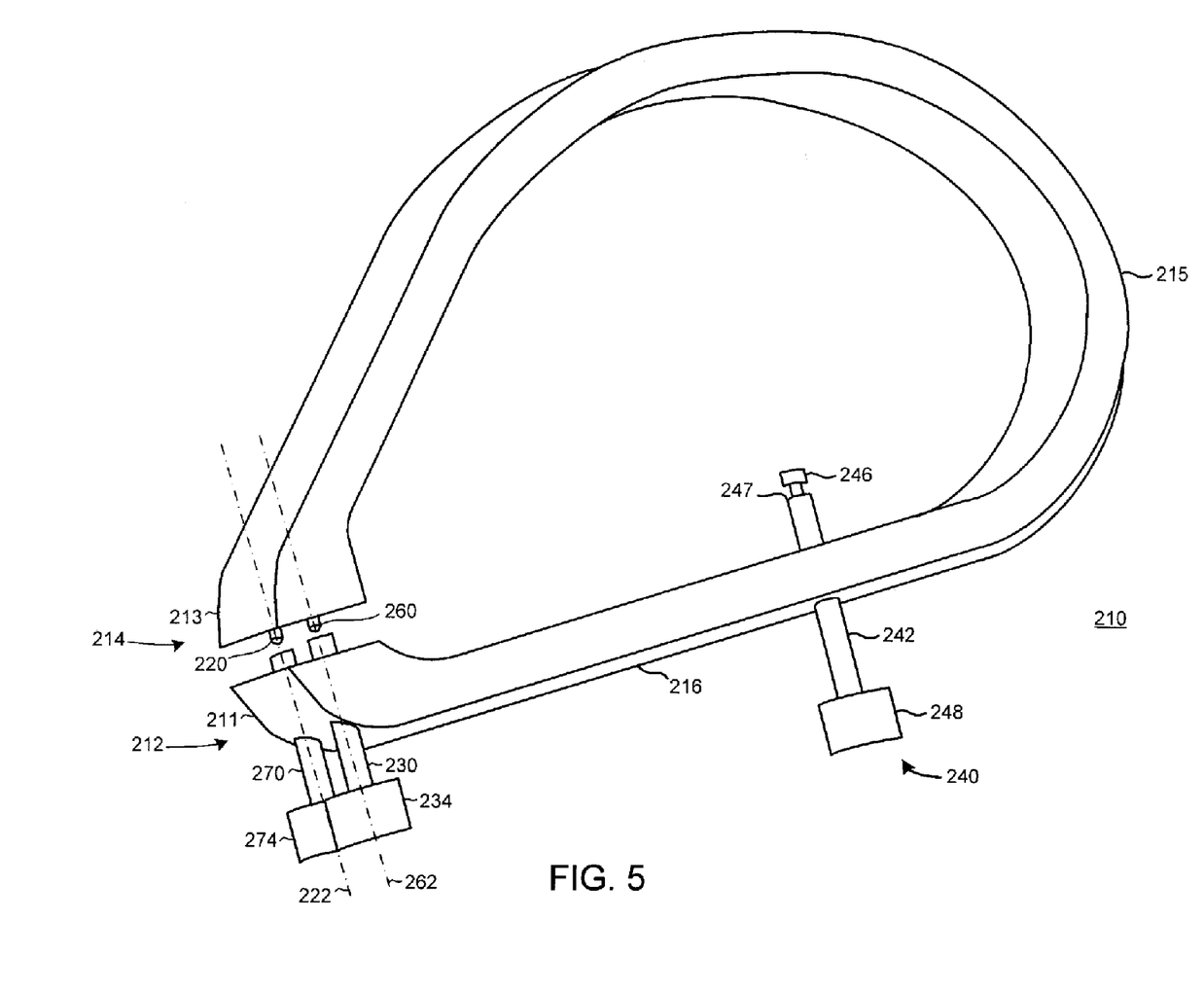
FIG. 5 is a perspective view of a third embodiment of the invention.

FIG. 5 is a perspective view of a third embodiment of the invention. In FIG. 5, a blind hole locator apparatus 210 may include a first locus-fixing structure 212 and a second locus-fixing structure 214 coupled by a connecting member 216. First locus-fixing structure 212 may be situated at a first end 211 of connecting member 216. Second locus-fixing structure 214 may be situated at a second end 213 of connecting member 216. Connecting member 216 may be substantially rigid and may have a length of sufficient dimension to reach around a workpiece (not shown in FIG. 5) by a bight-shaped connecting structure 215 connecting ends 211, 213. Ends 211, 213 may be separated by a distance appropriate to accommodate a workpiece.

First locus-fixing structure 212 may include two site locating units 230, 270. First locus-fixing structure 212 may include more than two site locating units 230, 270; two site locating units are illustrated here for simplicity of explanation.

Site locating unit 230 may be embodied in a drill bushing having a drilling aperture (not visible in FIG. 5) traversing site locating unit 230 substantially coaxially with an axis 222. The drilling aperture may be configured for accepting a drilling tool of appropriate size to produce a drilled aperture in a workpiece (not shown in FIG. 5).

Site locating unit 230 may be configured to effect threaded engagement of site locating unit 230 with connecting member 216 to facilitate controlled advancement of site locating unit 230 through connecting member 216 to effect compressively capturing a workpiece in an installed orientation between site locating unit 230 and second end 213 of connecting member 216. Site locating unit 230 may include an integral actuating section 234 for presenting an enhanced manual engagement by a user for facilitating hand rotation to effect threaded advancement of site locating unit 230 through connecting member 216.

Site locating unit 270 may be embodied in a drill bushing having a drilling aperture (not visible in FIG. 5) traversing site locating unit 70 substantially coaxially with an axis 262. The drilling aperture may be configured for accepting a drilling tool of appropriate size to produce a drilled aperture in a workpiece (not shown in FIG. 5).

Site locating unit 270 may be configured to effect threaded engagement of site locating unit 270 with connecting member 216 to facilitate controlled advancement of site locating unit 270 through connecting member 216 to effect compressively capturing a workpiece in an installed orientation between site locating unit 270 and second end 213 of connecting member 216. Site locating unit 270 may include an integral actuating section 274 for presenting an enhanced manual engagement by a user for facilitating hand rotation to effect threaded advancement of site locating unit 270 through connecting member 216.

Second locus-fixing structure 214 may include two locating pins 220, 260 for insertion within a reference aperture (not shown in detail in FIG. 5; see FIG. 3) in a workpiece. Second locus-fixing structure 214 may include more than two locating pins 220, 260; two locating pins are illustrated here for simplicity of explanation.

Locating pin 220 may be press-fit within connecting member 216 or otherwise removably affixed with connecting member 216. Such removable installation of locating pin 220 may facilitate replacement of locating pin 220 in the event of damage, excessive wear or another event involving locating pin 220 affecting trueness of alignment of locating pin 220. Locating pin 220 may be substantially symmetrically oriented about axis 222. Connecting member 216 may be configured to fixedly assure substantially coaxial alignment with axis 222 by locating pin 220 and site locating unit 270. Locating pin 220 may be configured having any of various cross-sections including by way of example and not by way of limitation cylindrical, square, star-shaped or another cross-section. Locator pin 220 may extend a distance from end 213 of connecting member 216 sufficient to accommodate seating within reference apertures in a workpiece.

Locating pin 260 may be press-fit within connecting member 216 or otherwise removably affixed with connecting member 216. Such removable installation of locating pin 260 may facilitate replacement of locating pin 260 in the event of damage, excessive wear or another event involving locating pin 260 affecting trueness of alignment of locating pin 260. Locating pin 260 may be substantially symmetrically oriented about axis 262. Connecting member 216 may be configured to fixedly assure substantially coaxial alignment with axis 262 by locating pin 260 and site locating unit 230. Locating pin 260 may be configured having any of various cross-sections including by way of example and not by way of limitation cylindrical, square, star-shaped or another cross-section. Locator pin 260 may extend a distance from end 213 of connecting member 216 sufficient to accommodate seating within reference apertures in a workpiece.

Apparatus 210 may also include at least one additional support member 240. Support member 240 may be embodied in a shaft 242 threadedly received within connecting member 216. Shaft 242 may have an engagement member 246 affixed at an end 247 proximate to workpiece in an installed orientation (not shown in FIG. 5). Support member 240 may include an integral actuating section 248 for presenting an enhanced manual engagement by a user for facilitating hand rotation to effect threaded advancement of support member 240 through connecting member 216. Threaded reception of shaft 242 within connecting member 216 may facilitate controlled advancement by shaft 242 through connecting member 216 to urge engagement member 246 against workpiece in an installed orientation to provide additional fixing support between apparatus 210 and the workpiece during operations upon the workpiece such as, by way of example and not by way of limitation, drilling operations on the workpiece conducted through at least one of site locating units 230, 270. By way of example and not by way of limitation, engagement member 246 may be embodied in a nylon foot structure that may be fixedly installed on shaft 242. Engagement structure 246 may be rotatably installed on shaft 242 so as to accommodate orientations between a workpiece and shaft 242 other than a generally perpendicular orientation.

Figure 6:
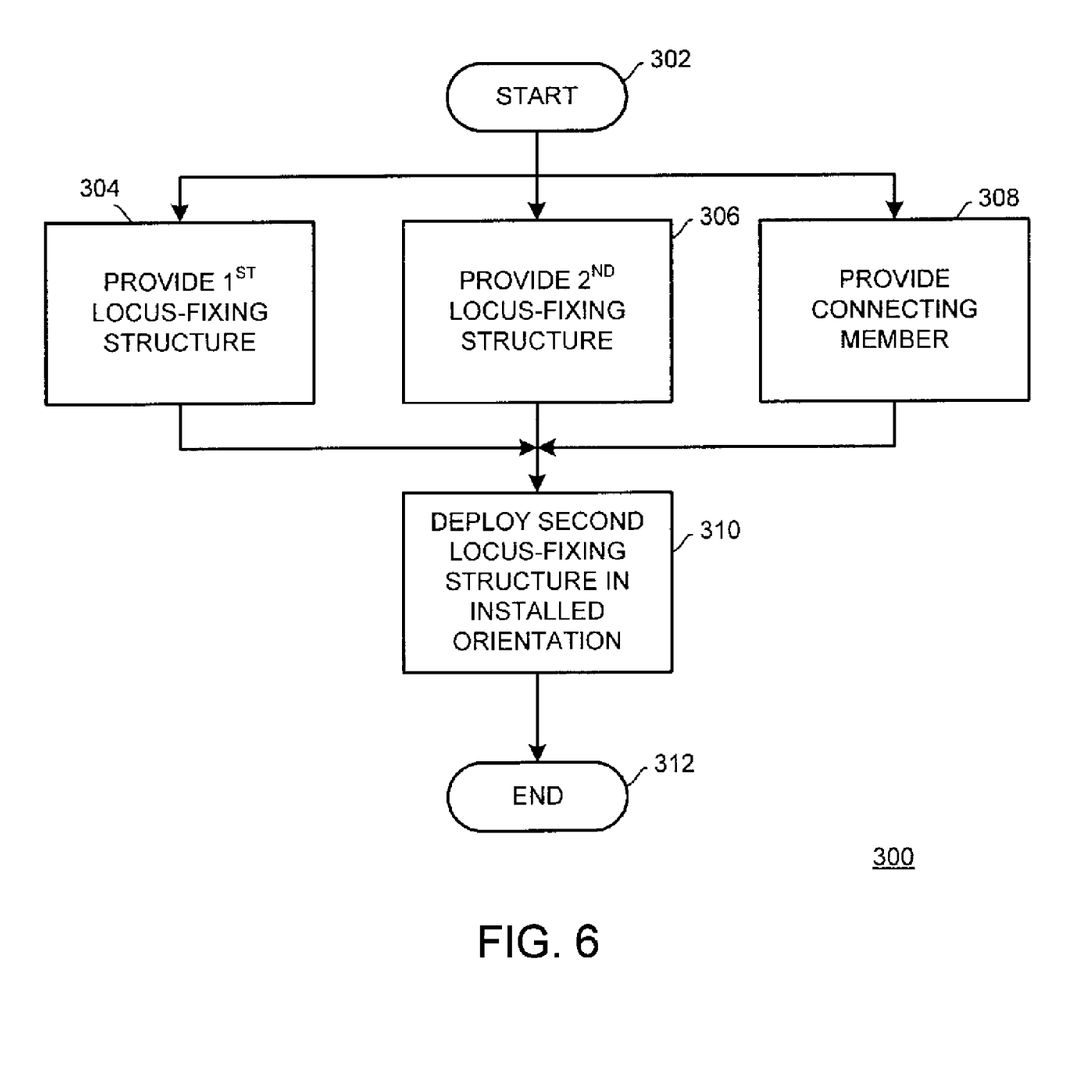
FIG. 6 is a flow chart illustrating an embodiment of the method of the invention.

FIG. 6 is a flow chart illustrating an embodiment of the method of the invention. In FIG. 6, a method 300 for locating at least one site on a first side of a workpiece in a predetermined relation with at least one aperture located on a second side of the workpiece begins at a START locus 302. Method 300 continues by, in no particular order: (1) Providing at least one first locus-fixing structure; as indicated by a block 304. Each respective first locus-fixing structure of the at least one first locus-fixing structure is configured for effecting locating of at least one respective site of the at least one site. (2) Providing at least one second locus-fixing structure configured for cooperating with the at least one aperture to substantially fix the at least one second locus-fixing structure with respect to the workpiece in an installed orientation, as indicated by a block 306. (3) Providing a substantially rigid connecting member coupled with the at least one first locus-fixing structure and the at least one second locus-fixing structure, as indicated by a block 308.

Method 300 continues by deploying the at least one second locus-fixing structure in the installed orientation, as indicated by a block 310. The connecting member situates the at least one first locus-fixing structure substantially in the predetermined relation in the installed orientation. Method 300 terminates at an END locus 312.

It is to be understood that, while the detailed drawings and specific examples given describe preferred embodiments of the invention, they are for the purpose of illustration only, that the apparatus and method of the invention are not limited to the precise details and conditions disclosed and that various changes may be made therein without departing from the spirit of the invention which is defined by the following claims:

We claim:

1. An apparatus for locating a site on a first side of a workpiece in substantial register with an aperture located on a second side of said workpiece; said aperture being substantially oriented about an axis; the apparatus comprising:
   (a) a first locus-fixing structure configured for effecting said locating;
   (b) a second locus-fixing structure configured for cooperating with said aperture to substantially fix said second locus-fixing structure with respect to said axis in an installed orientation;
   (c) a substantially rigid connecting member coupled with said first locus-fixing structure and said second locus-fixing structure; said connecting member situating said first locus-fixing structure and said second locus-fixing structure substantially coaxially with respect to said axis in said installed orientation; and
   (d) at least one additional support member coupled with said connecting member for providing substantially rigid adjustable support between said workpiece and said connecting structure in said installed orientation.

2. An apparatus for locating a site on a first side of a workpiece in substantial register with an aperture located on a second side of said workpiece as recited in claim 1 wherein said second locus-fixing structure includes a locating pin; said locating pin being situated at least partially within said aperture in said installed orientation.

3. An apparatus for locating a site on a first side of a workpiece in substantial register with an aperture located on a second side of said workpiece as recited in claim 1 wherein said first locus-fixing structure is received within said connecting member; said first locus-fixing structure and said connecting structure being oriented to permit advancement of said first locus-fixing structure toward said workpiece to effect clamping said workpiece between said first locus-fixing structure and said second locus-fixing structure in said installed orientation.

4. An apparatus for locating a site on a first side of a workpiece in substantial register with an aperture located on a second side of said workpiece as recited in claim 1 wherein said first locus-fixing structure is threadedly received within a receiving aperture in said connecting structure.

5. An apparatus for locating a site on a first side of a workpiece in substantial register with an aperture located on a second side of said workpiece as recited in claim 2 wherein said first locus-fixing structure is received within said connecting member; said first locus-fixing structure and said connecting structure being oriented to permit advancement of said first locus-fixing structure toward said workpiece to effect clamping said workpiece between said first locus-fixing structure and said second locus-fixing structure in said installed orientation.

6. An apparatus for locating a site on a first side of a workpiece in substantial register with an aperture located on a second side of said workpiece as recited in claim 2 wherein said first locus-fixing structure is threadedly received within a receiving aperture in said connecting structure.

7. An apparatus for locating at least one site on a first side of a workpiece in a predetermined relation with at least one aperture located on a second side of said workpiece; the apparatus comprising:
   (a) at least one first locus-fixing structure; each respective first locus-fixing structure of said at least one first locus-fixing structure being configured for effecting said locating at least one respective site of said at least one site;
   (b) at least one second locus-fixing structure configured for cooperating with said at least one aperture to substantially fix said at least one second locus-fixing structure with respect to said workpiece in an installed orientation;
   (c) a substantially rigid connecting member coupled with said at least one first locus-fixing structure and said at least one second locus-fixing structure; said connecting member situating said at least one first locus-fixing structure substantially in said predetermined relation in said installed orientation; and
   (d) at least one additional support member coupled with said connecting member for providing substantially rigid adjustable support between said workpiece and said connecting structure in said installed orientation.

8. An apparatus for locating at least one site on a first side of a workpiece in a predetermined relation with at least one aperture located on a second side of said workpiece as recited in claim 7 wherein at least one selected second locus-fixing structure of said at least one second locus-fixing structure includes a locating pin; said locating pin being situated at least partially within said aperture in said installed orientation.

9. An apparatus for locating at least one site on a first side of a workpiece in a predetermined relation with at least one aperture located on a second side of said workpiece as recited in claim 7 wherein at least one selected first locus-fixing structure of said at least one said first locus-fixing structure is received within said connecting member; said at least one selected first locus-fixing structure and said connecting structure being oriented to permit advancement of said at least one selected first locus-fixing structure toward said workpiece to effect clamping said workpiece between said at least one selected first locus-fixing structure and at least one respective second locus-fixing structure of said at least one second locus-fixing structure in said installed orientation.

10. An apparatus for locating at least one site on a first side of a workpiece in a predetermined relation with at least one aperture located on a second side of said workpiece as recited in claim 7 wherein at least one respective first locus-fixing structure of said at least one first locus-fixing structure is threadedly received within a respective receiving aperture in said connecting structure.

11. An apparatus for locating at least one site on a first side of a workpiece in a predetermined relation with at least one aperture located on a second side of said workpiece as recited in claim 8 wherein at least one selected first locus-fixing structure of said at least one said first locus-fixing structure is received within said connecting member; said at least one selected first locus-fixing structure and said connecting structure being oriented to permit advancement of said at least one selected first locus-fixing structure toward said workpiece to effect clamping said workpiece between said at least one selected first locus-fixing structure and at least one respective second locus-fixing structure of said at least one second locus-fixing structure in said installed orientation.

12. An apparatus for locating at least one site on a first side of a workpiece in a predetermined relation with at least one aperture located on a second side of said workpiece as recited in claim 8 wherein at least one respective first locus-fixing structure of said at least one first locus-fixing structure is threadedly received within a respective receiving aperture in said connecting structure.

13. A method for locating at least one site on a first side of a workpiece in a predetermined relation with at least one aperture located on a second side of said workpiece; the method comprising:
   (a) in no particular order:
      (1) providing at least one first locus-fixing structure; each respective first locus-fixing structure of said at least one first locus-fixing structure being configured for effecting said locating at least one respective site of said at least one site;
      (2) providing at least one second locus-fixing structure configured for cooperating with said at least one aperture to substantially fix said at least one second locus-fixing structure with respect to said workpiece in an installed orientation;
      (3) providing a substantially rigid connecting member coupled with said at least one first locus-fixing structure and said at least one second locus-fixing structure; and
      (4) providing at least one additional support member coupled with said connecting member; and
   (b) deploying said at least one second locus-fixing structure in said installed orientation; said connecting member situating said at least one first locus-fixing structure substantially in said predetermined relation in said installed orientation; said at least one additional support member providing substantially rigid adjustable support between said workpiece and said connecting structure in said installed orientation.

14. A method for locating at least one site on a first side of a workpiece in a predetermined relation with at least one aperture located on a second side of said workpiece as recited in claim 13 wherein at least one selected second locus-fixing structure of said at least one second locus-fixing structure includes a locating pin; said locating pin being situated at least partially within said aperture in said installed orientation.

15. A method for locating at least one site on a first side of a workpiece in a predetermined relation with at least one aperture located on a second side of said workpiece as recited in claim 13 wherein at least one selected first locus-fixing structure of said at least one said first locus-fixing structure is threadedly received within a respective receiving aperture in said connecting member; said at least one selected first locus-fixing structure and said connecting structure being oriented to permit advancement of said at least one selected first locus-fixing structure toward said workpiece to effect clamping said workpiece between said at least one selected first locus-fixing structure and at least one respective second locus-fixing structure of said at least one second locus-fixing structure in said installed orientation.

16. A method for locating at least one site on a first side of a workpiece in a predetermined relation with at least one aperture located on a second side of said workpiece as recited in claim 14 wherein at least one selected first locus-fixing structure of said at least one said first locus-fixing structure is threadedly received within a respective receiving aperture in said connecting member; said at least one selected first locus-fixing structure and said connecting structure being oriented to permit advancement of said at least one selected first locus-fixing structure toward said workpiece to effect clamping said workpiece between said at least one selected first locus-fixing structure and at least one respective second locus-fixing structure of said at least one second locus-fixing structure in said installed orientation.

* * * * *